United States Patent
Lee et al.

(10) Patent No.: US 8,503,381 B2
(45) Date of Patent: Aug. 6, 2013

(54) APPARATUS AND METHOD FOR CONFIGURING RADIO CONNECTION IN MULTIPLE COMPONENT CARRIER SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 444 days.

(21) Appl. No.: 12/847,792

(22) Filed: Jul. 30, 2010

(65) Prior Publication Data

US 2011/0026476 A1    Feb. 3, 2011

Related U.S. Application Data

(60) Provisional application No. 61/230,995, filed on Aug. 3, 2009.

(30) Foreign Application Priority Data

Jul. 13, 2010  (KR) .................. 10-2010-0067268

(51) Int. Cl.
*H04W 4/00*    (2009.01)

(52) U.S. Cl.
USPC .................... 370/329; 370/437; 370/465

(58) Field of Classification Search
USPC ......... 370/328–329, 335–336, 338, 342–343, 370/345, 437, 441–444, 465
See application file for complete search history.

(56) References Cited

U.S. PATENT DOCUMENTS

| | | | |
|---|---|---|---|
| 7,164,664 B2* | 1/2007 | Duran et al. ............ | 370/329 |
| 2005/0281269 A1* | 12/2005 | Choi ...................... | 370/395.2 |
| 2007/0191010 A1* | 8/2007 | Kim et al. ............. | 455/436 |
| 2010/0254329 A1* | 10/2010 | Pan et al. .............. | 370/329 |
| 2010/0296389 A1* | 11/2010 | Khandekar et al. ..... | 370/216 |
| 2010/0296467 A1* | 11/2010 | Pelletier et al. ........ | 370/329 |
| 2011/0110315 A1* | 5/2011 | Chen et al. ............ | 370/329 |
| 2011/0243066 A1* | 10/2011 | Nayeb Nazar et al. ... | 370/328 |
| 2012/0014329 A1* | 1/2012 | Kwon et al. ........... | 370/328 |

* cited by examiner

*Primary Examiner* — Kevin Mew
(74) *Attorney, Agent, or Firm* — Mckenna Long & Aldridge, LLP

(57) ABSTRACT

A method of a Mobile Station (MS) configuring radio connection in a multiple component carrier system is provided. The method includes receiving distribution information from a Base Station (BS) through a first Component Carrier (CC), selecting a second CC for radio connection to the BS on a basis of the distribution information, and performing the radio connection through the second CC.

15 Claims, 11 Drawing Sheets

APPARATUS AND METHOD FOR CONFIGURING RADIO CONNECTION IN MULTIPLE COMPONENT CARRIER SYSTEM

CROSS-REFERENCE TO RELATED APPLICATIONS

This application claims the benefit of priority of U.S. Provisional Application No. 61/230,995 filed on Aug. 3, 2009 and Korean Patent Application No. 10-2010-0067268 filed on Jul. 13, 2010, which are incorporated by reference in their entirety herein.

BACKGROUND

1. Field of the Invention

The present invention relates to wireless communication and, more particularly, to an apparatus and method for configuring radio connection in a multiple component carrier system.

2. Related Art

Wireless communication systems are widely deployed in order to provide various kinds of communication services, such as voice and data. In general, the wireless communication systems are multiple access systems which can share available system resources (e.g., bandwidths and transmission power) and support communication with multiple users. The multiple access systems can include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In a common wireless communication system, although the bandwidth of uplink and the bandwidth of downlink are differently set up, only one carrier is taken into consideration. Even in 3rd Generation Partnership Project (3GPP) Long Term Evolution (LTE), the number of carriers constituting uplink and downlink is 1, and the bandwidth of uplink and the bandwidth of downlink bandwidth are in general symmetrical to each other on the basis of a single carrier. However, it is not easy to allocate a large frequency bandwidth except some regions in the world. Accordingly, in order to efficiently use small sliced bands, a spectrum aggregation technique for producing the same effect as that a logically large band is used by binding a plurality of physically non-continuous bands in the frequency domain is being developed. The spectrum aggregation technique includes, for example, a technique in which 3GPP LTE is configured to support the system bandwidth of 100 MHz using multiple carriers although it supports the bandwidth of a maximum of 20 MHz and a technique in which an asymmetrical bandwidth is allocated between uplink and downlink.

Meanwhile, a User Equipment (UE) can be in a Radio Resource Control (RRC) connected mode or an RRC idle mode. When the UE is in the RRC connected mode, the UE and a Base Station (BS) have their radio links connected to each other. When the UE is in the RRC idle mode, the UE can connect a radio link to the BS by sending an RRC connection request message to the BS at any time.

In a multiple component carrier system, however, whether an RRC connection request message will be sent through which component carrier has not yet been determined. Further, in the case in which a plurality of user equipments perform an RRC connection request through only a specific component carrier having a good channel state, overhead can occur because of excessive uplink transmission through the specific component carrier. Accordingly, there is a need for an apparatus and method for configuring radio connection by properly distributing component carriers used for the radio connection.

SUMMARY

It is, therefore, an object of the present invention to provide an apparatus and method for configuring radio connection in a multiple component carrier system.

Another object of the present invention is to provide a method of selecting a component carrier necessary to configure radio connection in a multiple component carrier system.

In an aspect, a method of a Mobile Station (MS) configuring radio connection in a multiple component carrier system is provided. The method includes receiving distribution information from a Base Station (BS) through a first Component Carrier (CC), selecting a second CC for radio connection to the BS on a basis of the distribution information, and performing the radio connection through the second CC.

In another aspect, a method of a BS configuring radio connection in a multiple component carrier system is provided. The method includes sending distribution information to an MS through a first downlink CC, and receiving a radio connection request message from the MS through a second uplink CC selected on a basis of the distribution information.

In yet another aspect, an apparatus for configuring radio connection in a multiple component carrier system is provided. The apparatus includes a distribution information reception unit for receiving distribution information including a probability factor based on which a CC for radio connection is selected, a radio connection CC selection unit for selecting the CC for the radio connection by comparing the probability factor and a randomly generated test value, and a radio connection request message transmission unit for sending a radio connection request message through the selected CC.

In a plurality component carrier system, an MS selects a component carrier based on a distribution information provided by a certain carrier (or a cell), and transmits an RRC connection request message through the selected component carrier. Therefore, an overhead problem, which RRC connection request messages are concentrated on a specific carrier, can be solved.

BRIEF DESCRIPTION OF THE DRAWINGS

The above and other objects and features of the present invention will become apparent from the following description of preferred embodiments given in conjunction with the accompanying drawings, in which.

DESCRIPTION OF EXEMPLARY EMBODIMENTS

Figure 1:
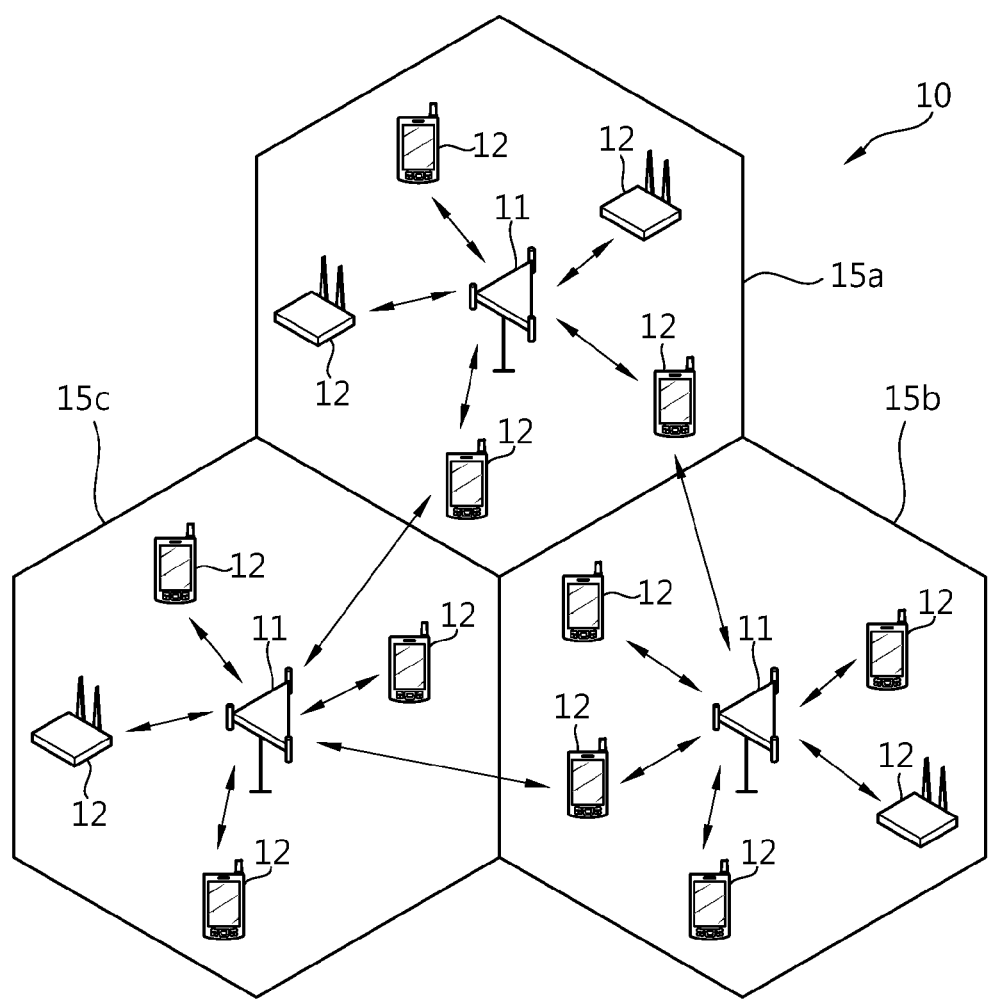
FIG. 1 is a diagram showing a wireless communication system.

Some embodiments of the present invention will now be described in detail with reference to the accompanying drawings. It is to be noted that in assigning reference numerals to respective constituent elements in the drawings, the same reference numerals designate the same constituent elements although the constituent elements are shown in different drawings. Further, in describing the embodiments of the present invention, a detailed description of pertinent known constructions or functions will be omitted if it is deemed to make the gist of the present invention unnecessarily vague.

Further, in describing the constituent elements of this specification, terminologies, such as the first, the second, A, B, (a), and (b), can be used. The terminologies are used to only distinguish constituent elements from other constituent elements, but the essence, sequence, and the like of the constituent elements are not limited by the terminologies. Further, in the case in which one constituent element is described to be "connected", "coupled", or "linked" to the other constituent element, the one constituent element can be directly connected or coupled to the other constituent element, but it should be understood that a third constituent element may be "connected", "coupled", or "linked" between the constituent elements.

Further, in this specification, a wireless communication network is chiefly described. However, tasks performed in the wireless communication network can be performed in a process of a network managing system (e.g., a base station), such as controlling the wireless communication network and sending data, or can be performed in a mobile station coupled to the corresponding wireless communication network.

FIG. 1 is a diagram showing a wireless communication system.

Referring to FIG. 1, a wireless communication system 10 is broadly deployed to provide various communication services such as voice, packet data.

The wireless communication system 10 includes at least one Base Station (hereinafter referred to as 'BS') 11. The BSs 11 provide communication services to respective geographical areas (in general, called 'cells') 15a, 15b, and 15c. The cell can be divided into a plurality of areas (called 'sectors').

A Mobile Station (hereinafter referred to as an 'MS') 12 can be fixed and mobile and also referred to as another terminology, such as a User Equipment (UE), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station which communicates with the MSs 12, and it can be referred to as another terminology, such as an evolved-NodeB (eNB), a Base Transceiver System (BTS), or an access point. The cell should be comprehensively interpreted to indicate some regions covered by the BS 11. The cell includes a variety of coverage areas, such as a mega cell, a macro cell, a micro cell, a pico cell, and a femto cell.

Hereinafter, downlink refers to communication from the BS 11 to the MS 12, and uplink refers to communication from the MS 12 to the BS 11. In the downlink, a transmitter can be part of the BS 11 and a receiver can be part of the MS 12. In the uplink, a transmitter can be part of the MS 12 and a receiver can be part of the BS 11.

There are no limits to multiple access schemes to which a wireless communication system is applied. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, can be used. A Time Division Duplex (TDD) method of performing uplink transmission and downlink transmission at different times or a Frequency Division Duplex (FDD) method of performing uplink transmission and downlink transmission using different frequencies can be used.

The layers of a radio interface protocol between an MS and a network can be classified into L1 (i.e., a first layer), L2 (i.e., a second layer), and L3 (i.e., a third layer) based on the three lower layers of an Open System Interconnection (OSI) reference model which is widely known in the communication system. From among them, a physical layer belonging to the first layer provides information transfer service using a physical channel, a Radio Resource Control (hereinafter referred to as an 'RRC') layer located in the third layer functions to control radio resources between the MS and the network. To this end, in the RRC layer, RRC messages are exchanged between the MS and the network.

The physical layer belonging to the first layer provides information transfer service to a higher layer using the physical channel. The physical layer is connected to a Medium Access Control (hereinafter referred to as 'MAC') layer through a transport channel which is placed in a higher layer. Data are moved between the medium access control layer and the physical layer through the transport channel. Further, data are moved between different physical layers (i.e., the physical layers on the transmission side and the reception side) through the physical channel. The physical channel is modulated using an OFDM (Orthogonal Frequency Division Multiplexing) method, and it uses the time and frequency as radio resources.

The MAC layer of the second layer provides service layer through a logical channel to a Radio Link Control (hereinafter referred to as 'RLC') layer which is a higher. The RLC layer of the second layer supports reliable data transmission. The function of the RLC layer may be implemented using a function block within the MAC layer. In such a case, the RLC layer may not exist. The PDCP layer of the second layer performs a header compression function for reducing the size of an IP packet header including relatively large and unnecessary control information so that an IP packet, such as IPv4 or IPv6, can be efficiently sent in a radio range having a small bandwidth.

A Radio Resource Control (hereinafter referred to as 'RRC') layer located in the third layer is defined only in the control plane. The RRC layer is related to the configuration, re-configuration, and release of a Radio Bearer (hereinafter referred to as a 'RB) and is responsible for the control of logical channels, transport channels, and physical channels.

Here, the RB refers to service provided by the second layer for data transfer between an MS and an UTRAN. In the case in which RRC connection exists between the RRC of an MS and the RRC layer of a wireless network, the MS is in the RRC connected mode. In the case in which RRC connection does not exist between the RRC of an MS and the RRC layer of a wireless network, the MS is in the RRC idle mode. A Non-Access Stratum (NAS) layer placed over the RRC layer performs functions, such as session management and mobility management.

A carrier aggregation (CA) supports a plurality of carriers, and it is also called a spectrum aggregation or a bandwidth aggregation. An individual unit carrier bound by the carrier aggregation is referred to as a Component Carrier (hereinafter referred to as a 'CC'). Each CC is defined by a bandwidth and a center frequency. The carrier aggregation is used to support an increasing throughput, prevent an increase of the costs resulting from the introduction of broadband RF (radio frequency) devices, and guarantee compatibility with the existing system.

For example, assuming that 5 CCs are allocated as the granularity of a carrier unit having a bandwidth of 5 MHz, a maximum of a bandwidth of 20 MHz can be supported.

Figure 2:
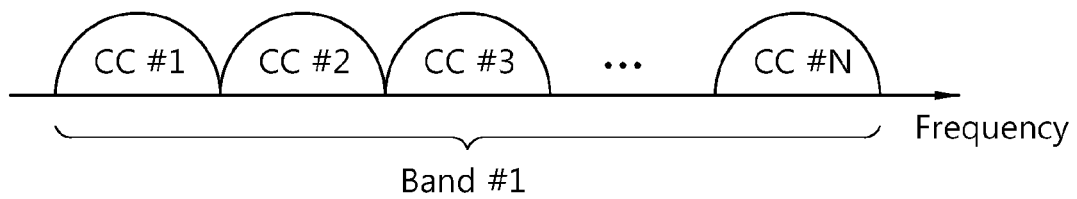
FIG. 2 is an explanatory diagram illustrating the same intra-band contiguous carrier aggregation.
Figure 3:
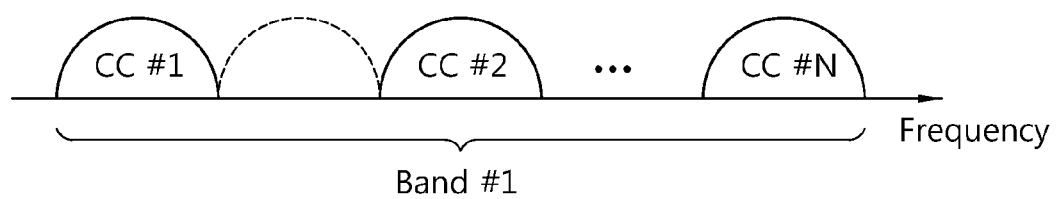
FIG. 3 is an explanatory diagram illustrating the same intra-band non-contiguous carrier aggregation.
Figure 4:
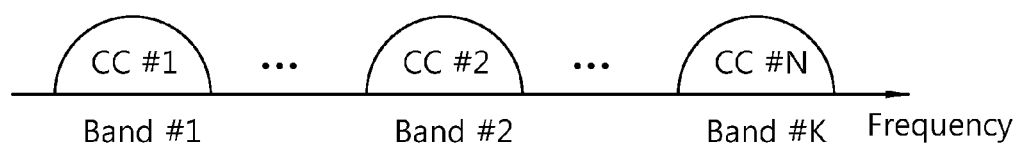
FIG. 4 is an explanatory diagram illustrating the same inter-band carrier aggregation.

The carrier aggregation can include the intra-band contiguous carrier aggregation such as that shown in FIG. 2, the intra-band non-contiguous carrier aggregation such as that shown in FIG. 3, and the inter-band carrier aggregation such as that shown in FIG. 4.

Referring first to FIG. 2, the intra-band contiguous carrier aggregation is performed between CCs consecutive to each other in the intra-band. For example, all CC#1, CC#2, CC#3, . . . , CC #N (i.e., aggregated CCs) are consecutive to each other.

Referring to FIG. 3, the intra-band non-contiguous carrier aggregation is performed between discontinuous CCs. For example, CC#1 and CC#2 (i.e., aggregated CCs) are spaced apart from each other with a specific frequency interposed therebetween.

Referring to FIG. 4, in the inter-band carrier aggregation, one or more of a plurality of CCs are aggregated on another frequency band. For example, a CC #1 (i.e., an aggregated CC) can exist in a band #1 and a CC #2 can exist in a band #2.

The number of aggregated downlink CCs and the number of aggregated uplink CCs can be differently configured. A case in which the number of downlink CCs is identical to the number of uplink CCs is called a symmetric aggregation, and a case in which the number of downlink CCs is different from the number of uplink CCs is called an asymmetrical aggregation.

Further, CCs can have different sizes (i.e., bandwidths). For example, assuming that 5 CCs are used to construct a 70 MHz band, the construction can include, for example, 5 MHz CC (carrier #0)+20 MHz CC (carrier #1)+20 MHz CC (carrier #2)+20 MHz CC (carrier #3)+5 MHz CC (carrier #4).

Hereinafter, a multiple carrier system refers to a system supporting the carrier aggregation. In the multiple carrier system, a contiguous carrier aggregation or a non-contiguous carrier aggregation or both can be used. Further, either a symmetrical aggregation or an asymmetrical aggregation can be used.

Figure 5:
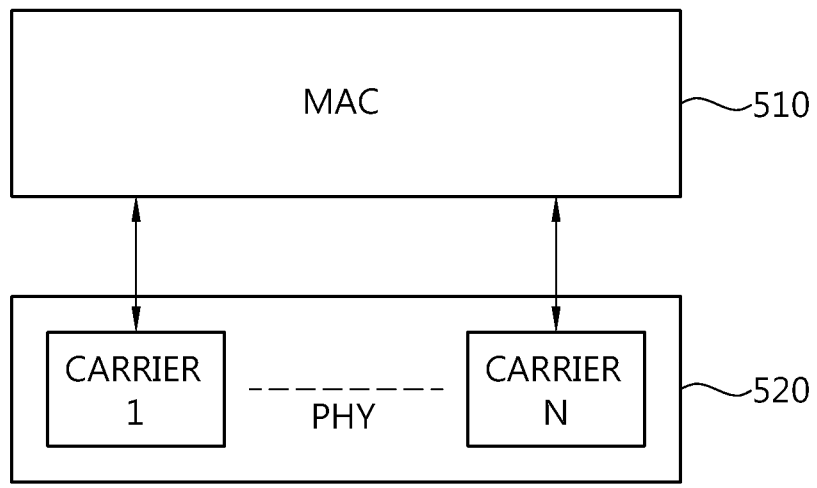
FIG. 5 is a diagram showing an example of a protocol structure multiple carriers.

FIG. 5 is a diagram showing an example of a protocol structure for supporting multiple carriers.

Referring to FIG. 5, a common MAC entity 510 manages a physical layer 520 which uses a plurality of carriers. An MAC management message transmitted through a specific carrier can be applied to other carriers. That is, the MAC management message can control other carriers including the specific carrier. The physical layer 520 can be operated according to a TDD or a FDD or both.

Several physical control channels are used in the physical layer 520. A Physical Downlink Control Channel (PDCCH) used to transmit physical control information informs an MS of the resource allocation of a PCH (paging channel) and a downlink shared channel (DL-SCH) and Hybrid Automatic Repeat Request (HARQ) information related to the DL-SCH. The PDCCH can carry an uplink grant informing an MS of the allocation of resources for uplink transmission.

A Physical Control Format Indicator Channel (PCFICH) is used to inform an MS of the number of OFDM symbols used in PDCCHs and transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information such as a Channel Quality Indicator (CQI). A Physical Uplink Shared Channel (PUSCH) carries an UL-SCH (uplink shared channel).

Figure 6:
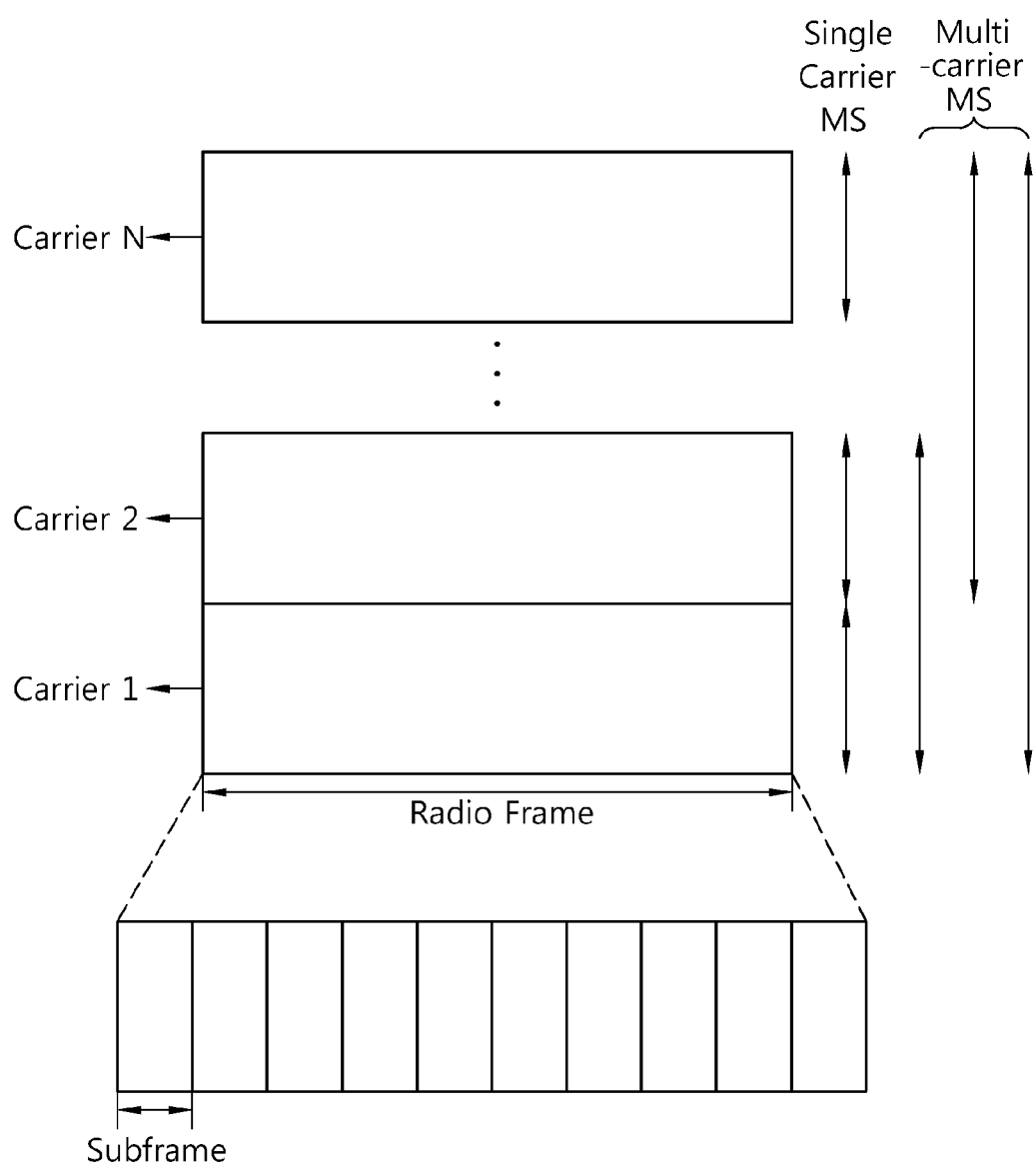
FIG. 6 is a diagram showing an example of a frame structure for a multiple carrier operation.

FIG. 6 is a diagram showing an example of a frame structure for a multiple carrier operation.

Referring to FIG. 6, a radio frame consists of 10 subframes. Each of the subframes includes a plurality of OFDM symbols. Each CC can have its own control channel (e.g., a PDCCH). The CCs may be contiguous to each other or may not be contiguous to each other. An MS can support one or more CCs according to its capability.

CCs can be classified into a fully configured CC and a partially configured CC according to its directionality. The fully configured CC is a bidirectional carrier which can transmit or receive or both all control signals and data. The partially configured CC is a unidirectional carrier which can send only downlink data. The partially configured CC is chiefly used in Multicast and Broadcast Service (MBS) or a Single Frequency Network (SFN) or both.

CCs can be classified into a Primary Component Carrier (hereinafter referred to as a 'PCC') and a Secondary Component Carrier (hereinafter referred to as an 'SCC') whether it is activated. The PCC is always activated, and the SCC is activated or deactivated according to specific conditions.

The term 'activation' means that traffic data are being transmitted or received or are in a ready state. The term 'deactivation' means that the transmission or reception of traffic data is impossible, but measurement or the transmission or reception of minimum information is possible.

An MS can use only one PCC or can use one or more SCCs together with the PCC. A PCC or a SCC or both can be allocated to an MS by a BS. The PCC can be a fully configured carrier and is a carrier in which major pieces of control information are exchanged between a BS and an MS. The SCC can be a fully configured carrier or a partially configured carrier and is a carrier allocated at the request of an MS or according to the instructions of a BS. The PCC can be used for an MS to enter a network or used to allocate an SCC or both. The PCC is not fixed to a specific carrier, but can be selected from among fully configured carrier. A carrier set to an SCC can also be changed to a PCC.

Figure 7:
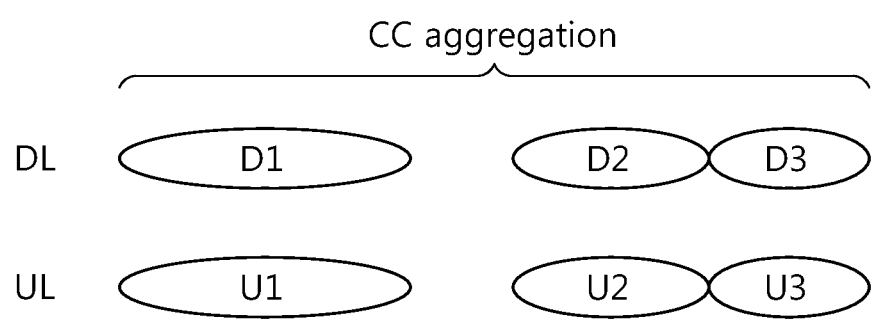
FIG. 7 is a diagram showing a linkage between a downlink component carrier and an uplink component carrier in a multiple carrier system.

FIG. 7 is a diagram showing a linkage between a downlink component carrier and an uplink component carrier in a multiple carrier system.

Referring to FIG. 7, in downlink, Downlink Component Carriers (hereinafter referred to as 'DL CC') D1, D2, and D3 are aggregated. In uplink, Uplink Component Carriers (hereinafter referred to as 'UL CC') U1, U2, and U3 are aggregated. Here, Di is an index of a DL CC, and Ui is an index of an UL CC (where i=1, 2, 3). At least one DL CC is a PCC, and the remaining DL CCs are SCCs. Likewise, at least one UL CC is a PCC and the remaining UL CCs are SCCs. For example, D1 and U1 can be PCCs, and D2, U2, D3, and U3 can be SCCs.

In an FDD system, a DL CC and an UL CC are linked to each other in a one-to-one manner. D1 is linked to U1, D2 is linked to U2, and D3 is linked to U3 in a one-to-one manner. An MS links DL CCs and an UL CC through system information transmitted by a logical channel BCCH or an RRC message dedicated for an MS, transmitted by a DCCH. Each link may be set up in a cell-specific manner or an MS-specific manner.

Examples of an UL CC linked to a DL CC are as follows.

1) UL CC through which ACK/NACK information will be transmitted by an MS with respect to data transmitted by a BS through a DL CC.

2) DL CC through which ACK/NACK information will be transmitted by a BS with respect to data transmitted by an MS through an UL CC.

3) DL CC through which a response to a Random Access Preamble (RAP) will be transmitted by a BS, the RAP being transmitted through an UL CC by an MS which starts a random access procedure.

4) UL CC to which uplink control information is applied when a BS sends uplink control information through a DL CC.

FIG. 7 illustrates only the 1:1 linkage between a DL CC and an UL CC, but a different linkage, such as 1:n or n:1, can be established. Further, the index of a CC does not always correspond to the physical order of the CC or the location of a frequency band of the corresponding CC.

In a multiple component carrier system, each idle MS can select a specific CC or cell through which radio connection between the each idle MS and a BS will be configured. For example, in the case in which radio connection to an MS is configured through a cell 2 of CC1, it may be said that the radio connection is configured through the CC1 or configured through the cell 2. Hereinafter, it is assumed that radio connection is configured in the CC dimension for consistency of description.

With the introduction of multiple component carriers, radio connection can be configured through one specific CC selected from among several CCs. An idle MS attempts radio connection by sending a radio connection message to a BS through an UL CC for radio connection.

It is assumed that idle MSs measure the channel states of a plurality of CCs and select respective CCs having the best channel state as CCs for radio connection. In this case, many idle MSs will select a CC, having a relatively good channel state, as a CC for radio connection and send respective radio connection request messages to a BS through the selected CC for radio connection. That is, the radio connection request messages are concentrated on a specific CC. The same is true of a case in which an idle MS selects or reselects a CC, having a high priority, as a CC for radio connection according to the priority of a frequency designated by a BS. Accordingly, there is a need for an apparatus and method for uniformly distributing the radio connection request messages of idle MSs over all CCs when radio connection is configured, by preventing the radio connection request messages of idle MSs from being concentrated on a specific CC.

It is hereinafter assumed that a specific UL CC to be used by an idle MS in order to configure radio connection is an UL CC for radio connection and a DL CC linked to the UL CC for radio connection is a DL CC for radio connection. The UL CC for radio connection and the DL CC for radio connection are collectively called a CC for radio connection.

Figure 8:
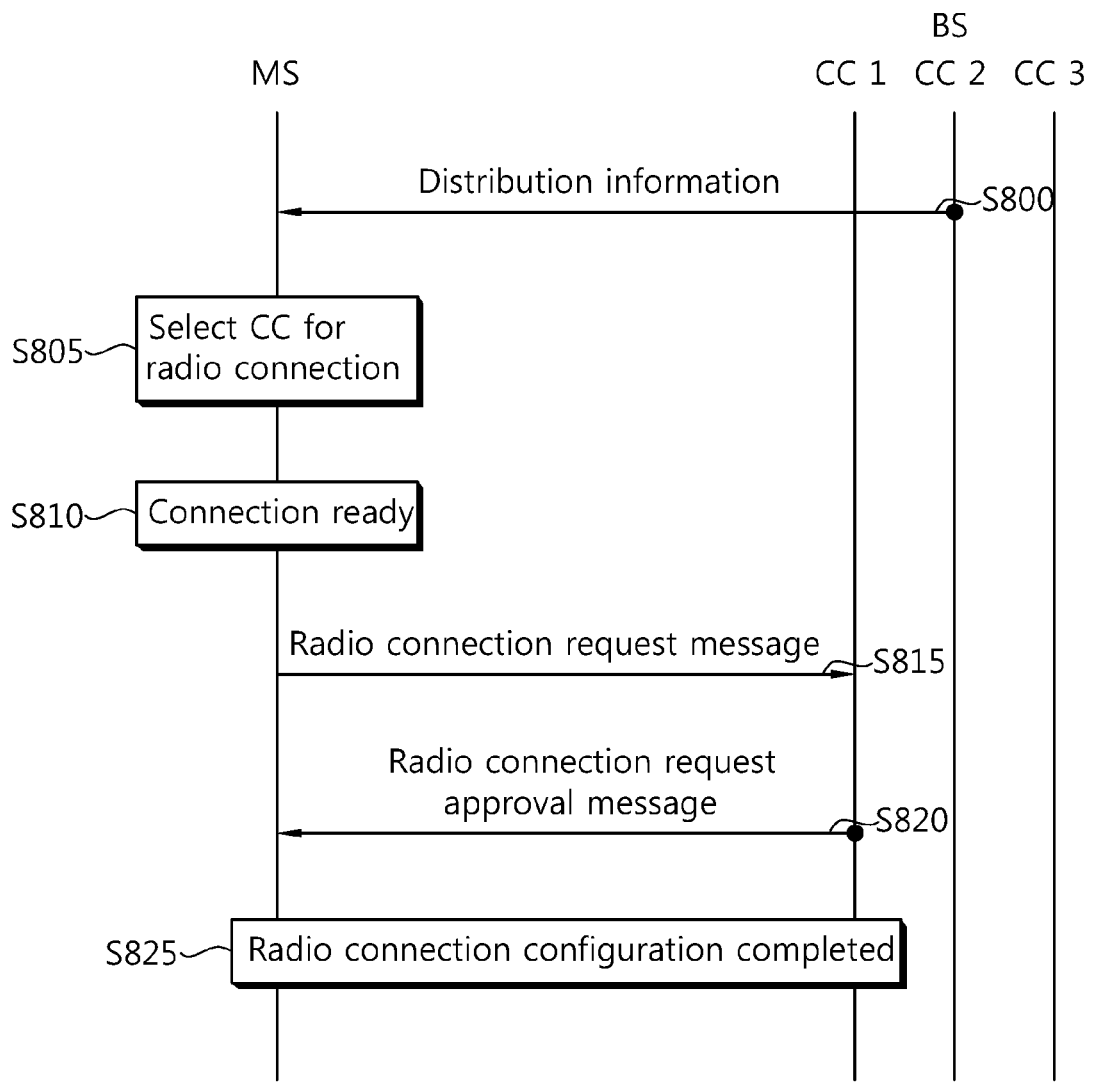
FIG. 8 is a flowchart illustrating a method of configuring radio connection in a multiple component carrier system according to an embodiment of the present invention.

FIG. 8 is a flowchart illustrating a method of configuring radio connection in a multiple component carrier system according to an embodiment of the present invention.

Referring to FIG. 8, it is assumed that a BS allocates component carriers CC1, CC2, and CC3 to an MS. The CC1, CC2, and CC3 are aggregated carriers. Each of the CC1, CC2, and CC3 includes a DL CC and an UL CC linked to the DL CC.

The MS is an idle MS and in a state in which radio connection configuration is available through the CC2 of the three component carriers. In this case, there is a possibility that other MSs except the idle MS can attempt radio connection through the CC2. Accordingly, the BS sends distribution information to the idle MS in order to reduce a probability that the idle MS attempts the radio connection through the CC2 at step S800. The distribution information is transmitted through a DL CC2.

The distribution information is control information used to determine a CC for radio connection for the MS. The distribution information includes a probability factor (i.e., a probability reference) to determine a CC for radio connection and information about the CC. The probability factor can have a value dedicated to each aggregated carrier or a value common to aggregated carriers. The information about the CC includes an identifier of the aggregated carrier.

The distribution information can be transmitted through a Broadcast Control Channel (BCCH) or a Dedicated Control Channel (DCCH) on the CC2. In the case where the distribution information is transmitted through the BCCH, the distribution information can be transmitted as system information.

In the case where the distribution information is transmitted through the DCCH, the distribution information can be included in an RRC connection request reject message or an RRC connection release message and then transmitted. The fact that the distribution information is included in the RRC connection request reject message means that a BS rejects an RRC connection request made by an MS through the specific CC and instructs the MS to reselect another CC as a CC for radio connection. The same is true of a case in which the distribution information is included in the RRC connection request release message.

The MS selects a CC for radio connection from among the aggregated carrier on the basis of the distribution information at step S805. If a specific CC is selected as a CC for radio connection, it means that the specific CC has passed a selection test using the distribution information. In the example of FIG. 8, it is assumed that the CC1 has been selected as the CC for radio connection. However, since the CC for radio connection needs not to be necessarily different from a CC through which the distribution information has been transmitted, the CC2 can be selected as the CC for radio connection, and one or more CCs may be selected as the CC for radio connection.

The MS enters a connection ready state at step S810. Here, the term 'connection ready' refers to a state in which an MS can perform downlink reception from a BS and perform uplink transmission to a BS. In some embodiments, the connection ready state may mean a state in which an MS camps on a CC for radio connection.

The MS sends a radio connection request message through the selected CC for radio connection if necessary at step S815. The radio connection request message is transmitted through an UL CC of the selected CC for radio connection. The radio connection can be RRC connection. In this case, the radio connection request message is an RRC connection request message. The BS sends a radio connection request approval message to the MS in response to the radio connection request message at step S820. Accordingly, the radio connection configuration through the selected CC for radio connection is completed at step S825.

In the case where a CC for radio connection is selected on the basis of priority or a channel state measured by an MS itself, there is a high possibility that only a certain CC having an excellent channel state will be selected. On the contrary, if the distribution information is used as in the present invention, there is a high probability that different CCs for radio connection will be selected by MSs. Consequently, the concentration of MSs on a specific CC can be prevented.

A method of selecting a CC for radio connection using a probability factor is described below.

Figure 9:
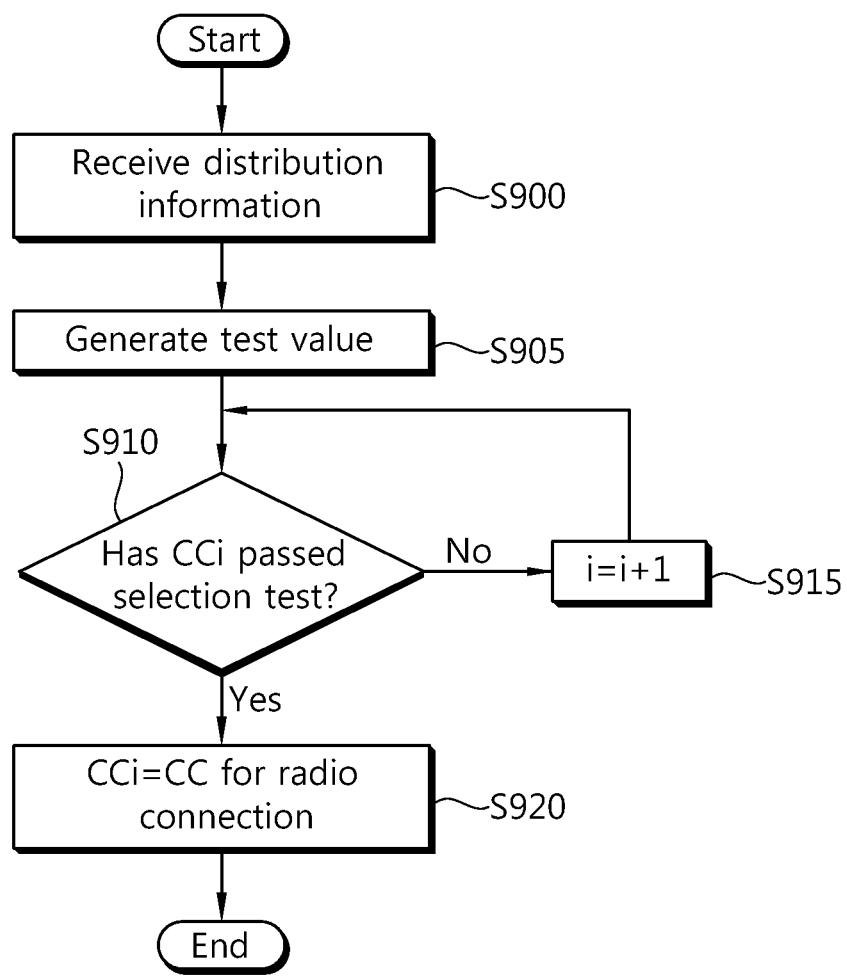
FIG. 9 is a flowchart illustrating a method of selecting a Component Carrier (CC) for radio connection according to an embodiment of the present invention.

FIG. 9 is a flowchart illustrating a method of selecting a CC for radio connection according to an embodiment of the present invention.

Referring to FIG. 9, an MS receives distribution information from a BS at step S900. The distribution information can be received through a BCCH or a DCCH.

The distribution information includes a Probability Factor (PF). Assuming that aggregated CCs for an MS include CC1, CC2, and CC3, the probability factor exists in each CC, an example of which is listed in Table 1 below.

TABLE 1

| CC1 | CC2 | CC3 |
|-----|-----|-----|
| PF1 | PF2 | PF3 |

Referring to Table 1, a specific probability factor is given to each CC. That is, a probability factor for CC1 is PF1, a probability factor for CC2 is PF2, and a probability factor for CC3 is PF3. Here, $0<PH_i<N$ (i=1, 2, 3), and $PF_i<PF(i+1)$ or $PF_i=PF(i+1)$.

The MS generates a test value to be used in a selection test at step S905. Here, the selection test is a test to determine whether a CC is appropriate to be a CC for radio connection. The test value is randomly generated by the MS. The test value is greater than 0 and smaller than or equal to a maximum value of the PF1, PF2, and PF3. For example, assuming that PF1=0.3, PF2=0.7, and PF3=1, a maximum value of the probability factor is 1. Accordingly, the MS can generate a value, greater than 0 and smaller than or equal to 1, as a test value. The test value is uniquely determined for every MS.

The MS determines whether a CCi has passed the selection test at step S910.

As an example of the selection test, the MS passes only a CC, corresponding to a minimum probability factor from among probability factors greater than the test value, on the selection test. For example, it is assumed that PF1=0.3, PF2=0.7, PF3=1, and a test value is 0.6. Values greater than the test value are 0.7 and 1. Among 0.7 and 1, 0.7 is the smallest value. Accordingly, a CC2 having the probability factor of 0.7 passes the selection test. If the test value is 0.2, the smallest probability factor from among all the probability factors greater than 0.2 is 0.3. Accordingly, a CC1 corresponding to the PF1 passes the selection test. Assuming that different test values for MSs are generated, there is a high possibility that the MSs will select different CCs for radio connection. That is, there is a high possibility that the MSs will be distributed on a plurality of component carriers. Accordingly, the concentration of the radio connection request messages of the MSs on a specific CC can be solved.

As another example of the selection test, the MS compares the test value and a probability factor PFi for a certain CCi of the CC1, CC2, and CC3. If, as a result of the comparison, the PFi is greater than or equal to the test value, the MS passes the CCi on the selection test. However, if, as a result of the comparison, the PFi is not greater than the test value, the MS does not pass the CCi on the selection test. For example, it is assumed that PF1=0.3, PF2=0.7, PF3=1, and a test value is 0.6. If an MS randomly selects the CC3, the CC3 passes the selection test because the PF3 is greater than the test value. If the MS randomly selects the CC1, the CC1 does not pass the selection test because the PF1 is smaller than the test value, and thus the MS randomly repeats the selection test for other CCs. Here, the probability factor can be a value common to all the aggregated CCs. Likewise, the MS performs the selection test in order to select a CC for radio connection.

As yet another example of the selection test, the MS can pass only a CC, corresponding to the smallest probability factor from among probability factors greater than a test value T calculated according to Equation 1 below, on the selection test.

$$T = ID \bmod(N)$$ [Equation 1]

Here, ID is an identifier of an MS, and it includes an International Mobile Subscriber Identity (IMSI), a Cell-Radio Network Temporary Identifier (C-RNTI), a Temporary Mobile Subscriber Identity (TMSII), and so on. N is a maximum value of a probability factor. Mod is a modulo operation.

For example, it is assumed that PF1=2, PF2=5, PF3=8, and an identifier of an MS is ID=35. Since a maximum value of a probability factor is N=8, T=35 Mod(8)=3 in accordance with Equation 1. A minimum probability factor from among probability factors greater than 3 is PF2=5. Accordingly, the MS passes the CC2 on the selection test.

If, as a result of the determination at step S910, the CCi has not passed the selection test, the MS performs the selection test for a CC(i+1) again at step S915. However, if, as a result of the determination at step S910, the CCi has passed the selection test, the MS determines the CCi as a CC for radio connection at step S920.

Figure 10:
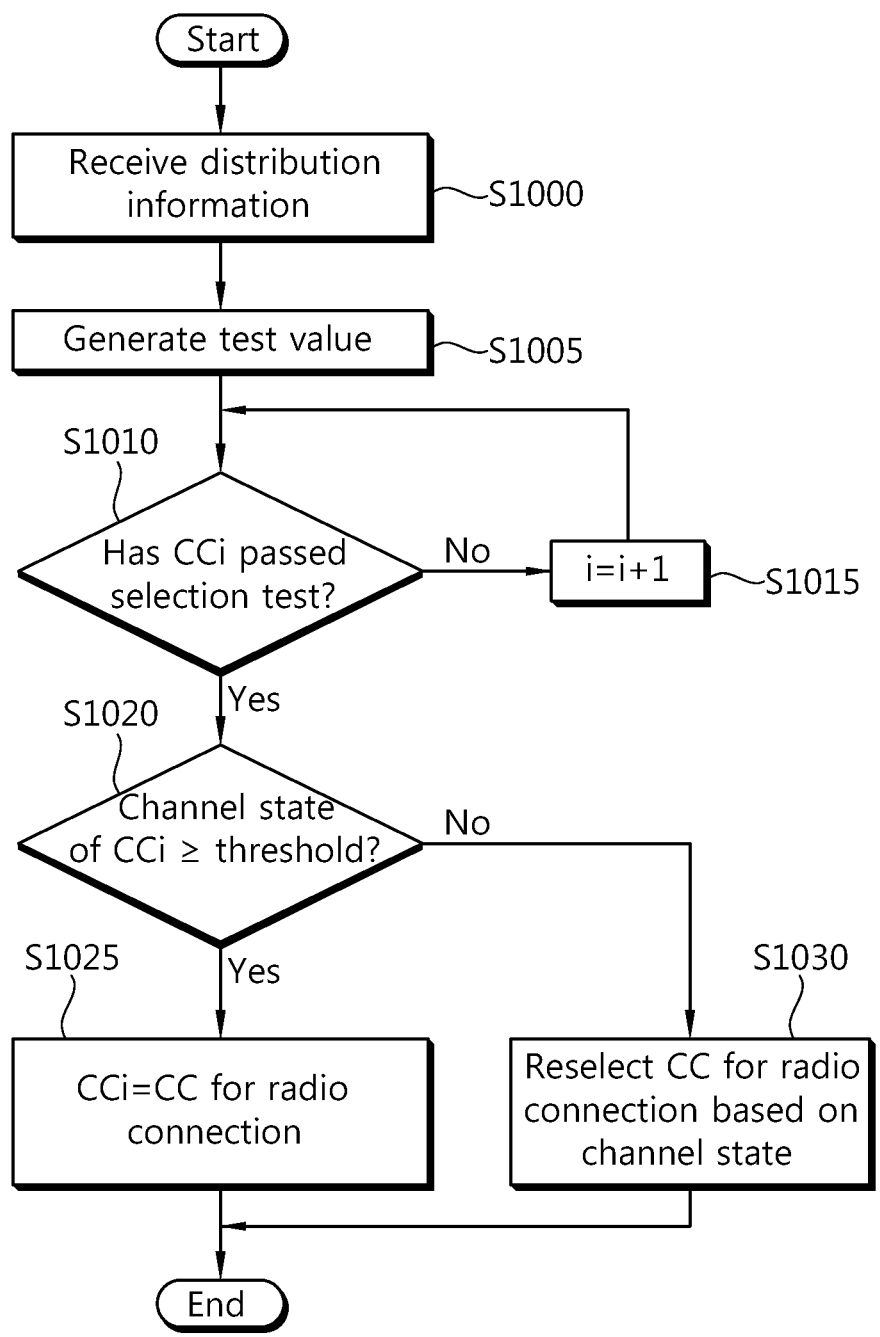
FIG. 10 is a flowchart illustrating a method of selecting a CC for radio connection according to another embodiment of the present invention.

FIG. 10 is a flowchart illustrating a method of selecting a CC for radio connection according to another embodiment of the present invention.

Referring to FIG. 10, an MS receives distribution information from a BS at step S1000. The distribution information can be received through a BCCD or a DCCH.

The MS generates a certain test value to be used in a selection test at step S1005. Here, the selection test is a test to determine whether a specific CC can become a CC for radio connection. The test value is randomly generated by the MS and is greater than 0 and smaller than or equal to a maximum probability factor from among the PF1, PF2, and PF3.

The MS determines whether a CCi has passed the selection test at step S1010. The selection test is performed in the same manner of step S910 as described above with reference to FIG. 9. If, as a result of the determination, the CCi has not passed the selection test, the MS performs the selection test for a CC(i+1) at step S1015.

However, if, as a result of the determination, the CCi has passed the selection test, the MS compares a threshold and a channel state of the CCi at step S1020. The threshold is a minimum channel state to be selected as a CC for radio connection. If, as a result of the comparison, the channel state is greater than or equal to the threshold, the MS determines the CCi as a CC for radio connection at step S1025. However, if, as a result of the comparison, the channel state is smaller than the threshold, the MS reselects a CC for radio connection on the basis of a channel state at step S1030.

Figure 11:
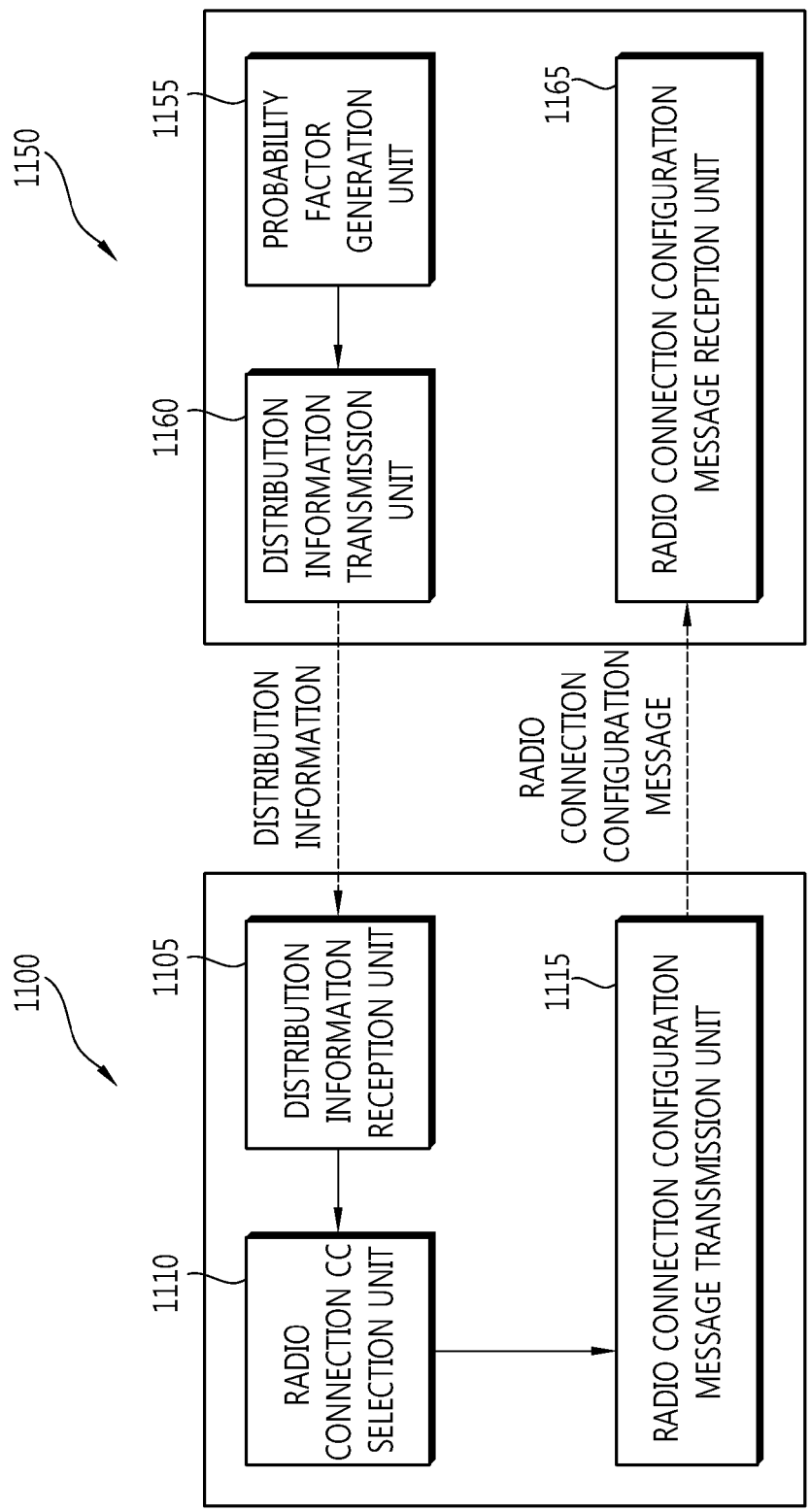
FIG. 11 is a block diagram of an apparatus for configuring radio connection according to yet another embodiment of the present invention.

FIG. 11 is a block diagram of an apparatus for configuring radio connection according to yet another embodiment of the present invention.

Referring to FIG. 11, a multiple component carrier system includes a first radio connection configuration apparatus 1100 and a second radio connection configuration apparatus 1150. The first radio connection configuration apparatus 1100 can be part of an MS. The second radio connection configuration apparatus 1150 can be part of a BS.

The first radio connection configuration apparatus 1100 includes a distribution information reception unit 1105, a radio connection CC selection unit 1110, and a radio connection configuration message transmission unit 1115.

The distribution information reception unit 1105 receives distribution information from the second radio connection configuration apparatus 1150. The distribution information is control information necessary for the radio connection CC selection unit 1110 to determine a CC for radio connection. The distribution information includes a probability factor (i.e., a probability reference) to determine a CC for radio connection and information about the CC. The probability factor can have a value specific to each aggregated carrier or a value common to all aggregated carriers. The information about the CC includes an identifier of the aggregated carrier. The distribution information can be system information and received through a broadcast control channel. Alternatively, the distribution information can be an RRC connection request reject message/an RRC connection release message and received through a dedicated control channel.

The radio connection CC selection unit 1110 performs a selection test on the basis of a probability factor included in the distribution information and selects a CC that has passed the selection test as a CC for radio connection. The selection test is performed in the same manner as described above with reference to FIG. 8.

The radio connection configuration message transmission unit 1115 sends a radio connection configuration message to the second radio connection configuration apparatus 1150 through the CC for radio connection selected by the radio connection CC selection unit 1110. The radio connection configuration message is generated in the RRC layer and can be an RRC connection configuration message.

The second radio connection configuration apparatus 1150 includes a probability factor generation unit 1155, a distribution information transmission unit 1160, and a radio connection configuration message reception unit 1165.

The probability factor generation unit 1155 generates a probability factor specific to each CC or a probability factor common to all CCs. For example, the probability factor generation unit 1155 can generate a probability factor 0.3 for a CC1 and a probability factor 0.8 for a CC2. In some embodiments, the probability factor generation unit 1155 can generate a probability factor 0.5 common to a CC1 and a CC2.

The distribution information transmission unit 1160 generates distribution information including the probability factor and sends the distribution information to the first radio connection configuration apparatus 1100.

The radio connection configuration message reception unit 1165 receives a radio connection configuration message from the first radio connection configuration apparatus 1100.

In a system supporting a plurality of component carriers combined according to a carrier aggregation, an MS selects one carrier on the basis of distribution information provided by a specific carrier or cell and sends an RRC connection request message through the selected carrier. Accordingly, an overhead problem that RRC connection request messages are concentrated on a specific carrier can be solved.

While some exemplary embodiments of the present invention have been described with reference to the accompanying drawings, those skilled in the art can change and modify the present invention in various ways without departing from the essential characteristics of the present invention. Accordingly, the disclosed embodiments should not be construed as limiting the technical spirit of the present invention, but should be construed as illustrating the technical spirit of the present invention. The scope of the technical spirit of the present invention is not limited by the embodiments. The scope of the present invention should be interpreted according to the following appended claims. Accordingly, the present invention should be construed to cover all modifications or variations induced from the meaning and scope of the appended claims and their equivalents.

What is claimed is:

1. A method of a Mobile Station (MS) configuring radio connection in a multiple component carrier system, the method comprising:
receiving distribution information from a Base Station (BS) through a first Component Carrier (CC);
selecting a second CC for radio connection to the BS on a basis of the distribution information; and
performing the radio connection through the second CC,
wherein the distribution information includes a probability factor for the second CC, and
the second CC is selected on a basis of the probability factor,
wherein the second CC is generated by comparing the probability factor and a test value randomly generated by the MS, and
wherein the probability factor is the smallest probability factor from among other probability factors greater than the test value.

2. The method of claim 1, wherein the probability factor for the second CC is different from other probability factors for the other CCs.

3. The method of claim 1, wherein the probability factor is common to the other CCs.

4. The method of claim 1, wherein the radio connection is connection in a Radio Resource Control (RRC) layer level.

5. The method of claim 4, wherein performing the radio connection through the second CC comprises sending an RRC connection request message to the BS.

6. The method of claim 1, wherein the distribution information is received through a broadcast control channel (BCCH).

7. The method of claim 1, wherein the distribution information is received through a dedicated control channel (DCCH) dedicated to the MS.

8. The method of claim 7, wherein the distribution information is received via an RRC connection release message, indicating a release of RRC connection between the MS and the BS.

9. The method of claim 7, wherein the distribution information is received via an RRC connection request reject message, indicating a rejection of RRC connection request between the MS and the BS.

10. A method of a BS configuring radio connection in a multiple component carrier system, the method comprising:
sending distribution information to an MS through a first downlink CC;
receiving a radio connection request message from the MS through a second uplink CC selected on a basis of the distribution information;

sending a radio connection request reject message, including new distribution information, to the MS through a second downlink CC linked to the second uplink CC; and receiving a new radio connection request message from the MS through a third uplink CC selected on a basis of the new distribution information.

11. The method of claim 10, further comprising sending a radio connection request approval message to the MS through a second downlink CC linked to the second uplink CC.

12. An apparatus for configuring radio connection in a multiple component carrier system, the apparatus:

a distribution information reception unit for receiving distribution information including a probability factor based on which a CC for radio connection is selected;

a radio connection CC selection unit for selecting the CC for the radio connection by comparing the probability factor and a randomly generated test value; and a radio connection request message transmission unit for sending a radio connection request message through the selected CC, wherein the probability factor is different from the probability factors for the other CCs, and the probability is the smallest probability factor from among some probability factors greater than the test value.

13. The apparatus of claim 12, wherein the radio connection CC selection unit finally selects the CC for the radio connection based on the probability factor and a channel state of the CC.

14. The apparatus of claim 13, wherein the distribution information reception unit receives the distribution information through a BCCH.

15. The apparatus of claim 13, wherein the distribution information reception unit receives the distribution information through a DCCH.

* * * * *